United States Patent [19]

Greathouse

[11] Patent Number: 4,706,817

[45] Date of Patent: Nov. 17, 1987

[54] PORTABLE FOOD HOLDING DEVICE

[76] Inventor: Glen Greathouse, 2980 Pontius Rd., Uniontown, Ohio 44685

[21] Appl. No.: 882,786

[22] Filed: Jul. 7, 1986

[51] Int. Cl.[4] .......................... A45C 11/20; F24C 1/16
[52] U.S. Cl. ..................... 206/545; 206/546; 206/549; 206/557; 126/9 B; 126/25 R; 126/261; 126/268
[58] Field of Search ............... 126/9 R, 9 B, 30, 38, 126/41 R, 43, 261, 262, 265, 266, 268, 275 R, 275 E, 25 R, 304 R; 206/541, 545, 546, 549, 557; 312/236; 108/14, 106, 111

[56] References Cited

U.S. PATENT DOCUMENTS

| | | | |
|---|---|---|---|
| 1,459,319 | 6/1923 | Bloss | 108/14 |
| 2,119,799 | 6/1938 | Sivey | 126/9 R |
| 2,419,344 | 4/1947 | Eggleston | 126/25 |
| 2,473,569 | 6/1949 | Cast | 126/9 R |
| 2,515,521 | 7/1950 | Loffredo | 126/9 B |
| 2,541,528 | 2/1951 | McAvoy | 126/9 R |
| 2,666,426 | 1/1954 | Pollard | 126/9 B |
| 3,078,815 | 2/1963 | Curtis | 108/14 |
| 3,094,113 | 6/1963 | Avila | 126/30 |
| 3,124,057 | 3/1964 | Kiser | 126/9 R |
| 3,753,431 | 8/1973 | Koziol | 126/38 |
| 3,811,559 | 5/1974 | Carter | 126/266 |
| 4,548,193 | 10/1985 | Marogil | 126/30 |

Primary Examiner—Margaret A. Focarino
Attorney, Agent, or Firm—Oldham, Oldham & Weber Co.

[57] ABSTRACT

A portable food holding device is described comprising a table section with foldable legs and a cover attached thereto, adapted to maintain contained food in either a chilled or heated condition. When not in use the legs and cover may be folded to a collapsed position to form a compact unit which may be readily transported or stored. Means are disclosed for heating or cooling the contents of the device.

5 Claims, 3 Drawing Figures

PORTABLE FOOD HOLDING DEVICE

This invention relates to a folding, portable food holder. More particularly, this invention relates to a self-supporting, table-like food holding device having a collapsible canopy structure, which in its collapsed position, forms a protective sealing cover for the device. Specifically, this invention relates to a table-like, food holding device equipped with supporting, foldable legs and a collapsible canopy top which can be lowered to totally cover the container device, the device having the capability of forming a compact, readily transportable assembly when its legs and canopy are positioned in their transport mode.

BACKGROUND ART

While outdoor picnics have always been very popular, in recent years there has been an ever increasing tendency to prepare foods over charcoal grills, particularly in the yards of homes throughout the country. Typically, entrees thus prepared are eaten outside, together with supplemental side dishes, salads, and the like carried outdoors for the occasion. Meals provided in this manner tend to be festive affairs, and they provide a pleasant change from the daily mealtime routine, which undoubtedly has had much to do with their widespread attraction.

Despite their popularity, however, there are recognized drawbacks to outdoor picnic meals, the because of this, many individuals avoid them, preferring to eat indoors. While the reluctance on the part of such individuals can simply be explained by a preference for the comforts of indoor eating, many do not like the problems attendant to an outdoor eating environment. There is, for example, the unavoidable presence of flys and other insects which are attracted to, and frequently contaminate side dishes left exposed for the relatively long periods required to cook the main course of the meal. In addition, there is the problem of keeping items such as salads and other foods which taste better cold, sufficiently chilled while the main course is being prepared, particularly in a situation in which such foods are exposed to the sun. An additional aggravation comes from the effort involved in carrying tables outdoors to hold the side dishes and other supplemental foods, and from which such foods are to be served.

DISCLOSURE OF THE INVENTION

Now, however, the aforementioned difficulties and drawbacks have been largely overcome by the invention disclosed herein, one aspect of which is to provide a portable food holding device comprising a container fabricated in two halves which may be easily carried to its point of use, and the components thereof unfolded to provide a table structure and a canopy structure.

Alternatively, it is an aspect of one embodiment of this invention to provide a portable food holding device which includes wheels that may be unfolded, thus permitting the food holding device to be rolled to its place of use.

A further aspect of this invention is to provide a portable food holding device, the lower half of which comprises a table-like structure, and which is adapted for being equipped with heating or cooling means, suitable for holding either hot or cold food as required.

An additional aspect of this invention is to provide a portable, self supporting, tablelike food holding device, the upper half of which serves as a cover or lid which may either be lowered over the lower food holding half to maintain the food relatively isolated from its environment and from temperature changes, or raised when access to the contained food is required, to provide a canopy structure protecting the food from the sun and the elements.

The foregoing and other aspects of the herein described invention which will become apparent as the detailed description proceeds, are achieved by a portable food holding device comprising an upper cover section, a lower table section, means for collapsibly supporting said upper cover section on said lower table section, and collapsible means for supporting said table section over the surface in which it is placed.

Other aspects of the invention are attained by a portable food holding device comprising an upper half and a lower half, said upper or cover half being connected to said lower or food holding half by collapsible support means such that the two halves can be moved apart from each other thus permitting access to the contents of said lower half and simultaneously providing a canopy over said lower half, or such halves can be moved adjacent to each other, protectively covering said lower half and its contents, and wherein said lower half has attached thereto collapsible legs which may be deployed to support said lower half in table fashion above the surface over which said device is located.

Still further aspects of this invention are realized by a portable food holding device comprising an upper half and a lower half, said upper and lower halves being connected by attached collapsible support means, said lower half having attached thereto at least three collapsible supporting legs, said collapsible support means in its extended mode allowing sufficient clearance to provide access to said lower half, and wherein said upper and lower halves are made from a plastic material incorporating therein a heat insulating cellular structure.

BRIEF DESCRIPTION OF THE DRAWINGS

The invention will be better understood by reference to the drawings in which.

BEST MODE FOR CARRYING OUT THE INVENTION

Figure 1:
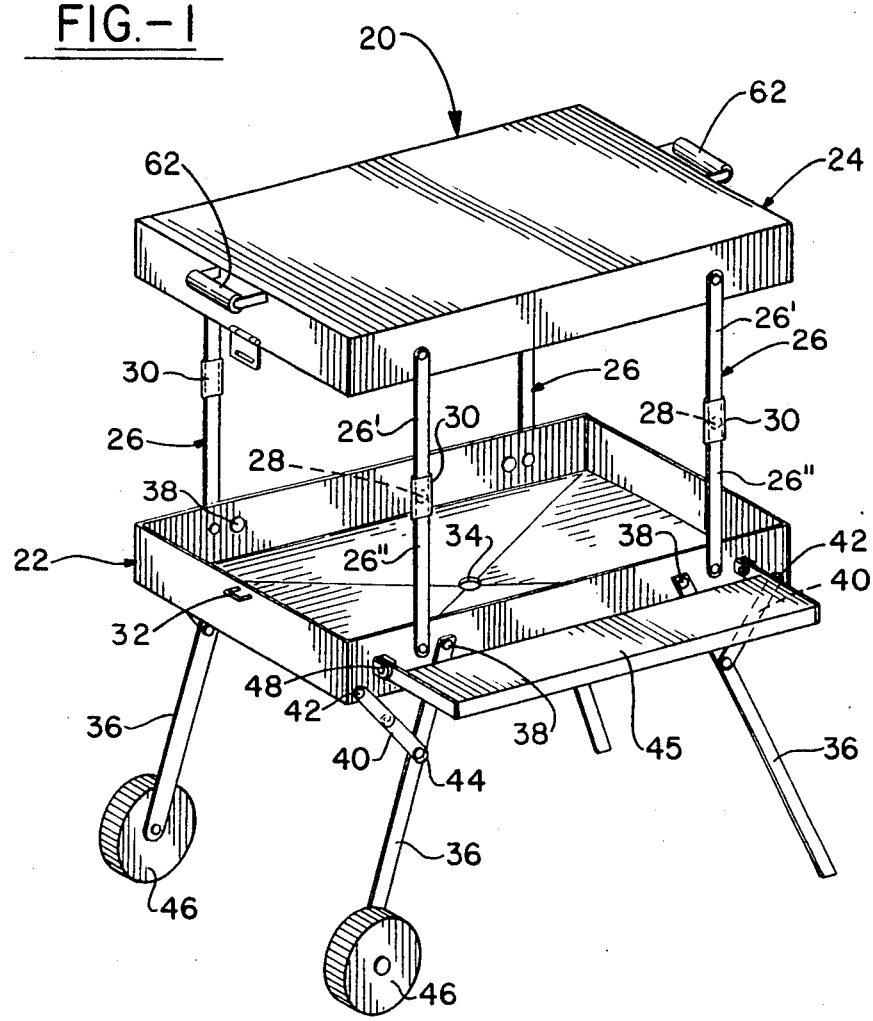
FIG. 1 is an isometric drawing of the food holding device of the invention.

Referring to the drawings, FIG. 1 shows the food holding device of the invention 20 unfolded in its position of use. In the Figure, it will be seen that the device consists of two sectional halves, which need not necessarily be of the same height, a table section 22, and a top canopy or cover section 24. In their uncollapsed or extended position, as shown, support members 26, which consist of upper and lower arms, 26' and 26", foldable about pivot points 28, are made rigid by sliding sleeves 30 over the pivot points, thus making the pivot points inoperative. The reverse procedure is used in collapsing the supports to lower cover section 24 over table section 22. When lowered, cover section 24 can be fastened securely to the table section 22 by a fastener such as hasp 32, hooks, or equivalent means.

In one embodiment, the table section 22 is fitted with a drain opening 34, for cleaning or draining purposes, which may be closed with a plug, not shown. When the food holding device is to be used to hold containers of food which are to be maintained in a chilled condition, the table section 22 may be filled with ice for that purpose.

The table section 22 is supported by collapsible legs 36. If desired, the table section 22 may be supported by four legs, or by one pair of opposite legs, for example the legs with wheels attached as shown in the Figure, and by a third leg located in the center of the food holding device at its other end, the third leg also being pivotally collapsible and braced in a fashion similar to that described below. Legs 36 pivot about pivot points 38, and in their deployed position, the legs are held in place by braces 40, pivoting about pivot points 42, which can be temporarily attached in their deployed position to the legs at points 44 by means of pins, extending projections matable to counterpart holes, or by other means well known in the art. If desired, wheels 46 may be attached to the legs to facilitate movement of the food holding device to selected use locations.

An optional feature which is sometimes of advantage, particularly for holding plates and for similar uses, is the provision of a side shelf 45, which is pivotable about pivot points 48 between its horizontal position of use, and a stored, vertical position.

In the process of preparing them for use, the legs 36 are swung down from a stored position along the side of the table section 22. Braces 40 are also swung down from their stored position along the side of the table section and temporarily fastened to the legs 36, thereby supporting the food holding device above the ground in a table-like fashion. The food holding device is then removed to its location of use, for example, by rolling it, when wheels 46 are provided.

Alternatively, the food holding device may be moved to its location of use and the legs 36 and braces 40 may then be deployed. Where provided, the wheels 46 may be mounted on all the legs 36, or any opposite pair of them.

The folded upper and lower arms of the support members 26 may then be moved about their respective pivot points 28 to an aligned position, and sleeves 30 slipped over them, thereby holding the cover section 24 in its extended, upright position. The food holding device is thereupon ready for use.

As mentioned, ice may be placed in the table section 22, and dishes of food or other items to be held in a chilled condition placed therein. If access to the table section 22 is not required immediately, the sleeves 30 may be moved away from their respective pivot points 28, and the cover section collapsed over the table section 22 and its contents, helping both to keep the contents cold, as well as in an insect-free environment.

While the drawing illustrates a particular mode of design for deploying and for storing the legs 36, braces 40, and support members 26, it will be understood that other equally useful foldable support systems may be employed for the purpose without departing from the spirit or scope of the invention disclosed herein.

Figure 2:
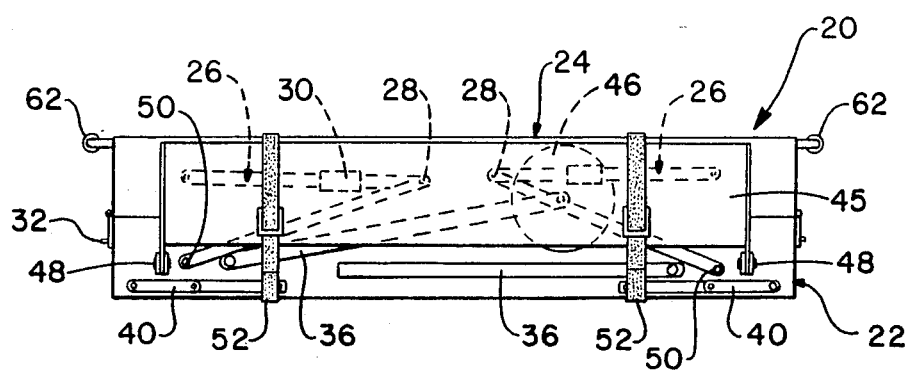
FIG. 2 is a side elevation of the food holding device of the invention in its folded, portable and storable position.

FIG. 2 shows the food holding device in its collapsed position, suitable for either transport or for storage. In the Figure, table section 22 is fastened to cover section 24 by fastener means 32. The legs 36, one pair of which in the embodiment shown has wheels 46 mounted thereon, are shown folded about their pivot points 38, together with braces 40, also folded about their pivot points 42, and stored alongside the collapsed food holding device.

Similarly, the upper and lower arms of folding support members 26 are folded about pivot points 50 with the sleeves 30 in their retracted position. The Figure shows an embodiment wherein the food holding device is equipped with a side shelf which has been rotated about pivot points 48 to its stowed position.

Although not absolutely necessary, it has been found convenient to provide means for securely fastening the legs, leg braces, shelf, and cover support members to the food holding device when the latter is in its storage mode. Among other well known ways, this may be accomplished by the provision of straps 52 placed at suitable intervals along the length of the device.

Figure 3:
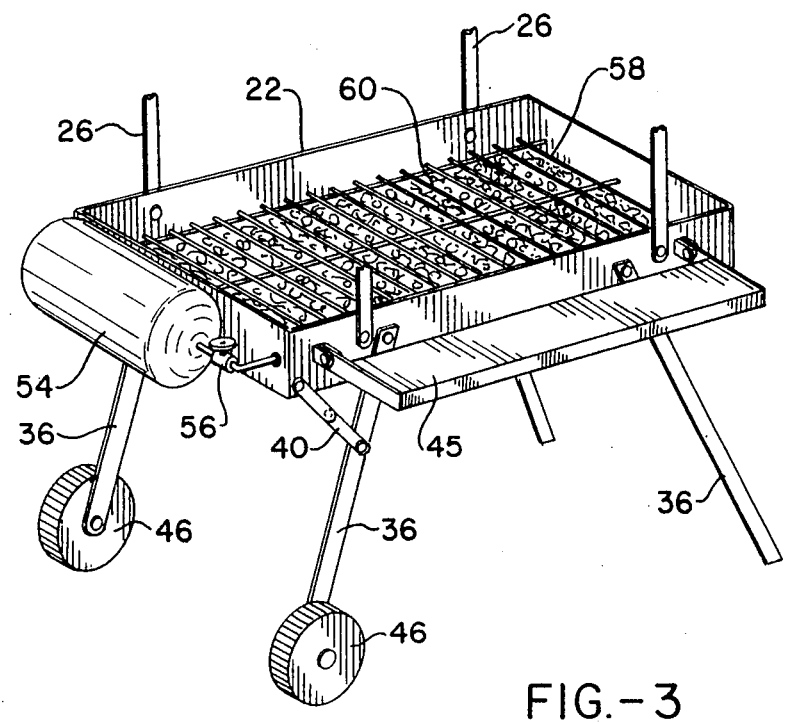
FIG. 3 is an isometric drawing of a portion of the lower section of the food holding device showing an embodiment of the invention equipped for supplemental heating of the contained food.

FIG. 3 shows an embodiment of the invention in which the food holding device is adapted to maintain food placed therein in a heated condition. In the Figure, the table section 22 supported by legs and leg braces 36 and 40, respectively, and with cover support members 26, as well as a shelf 45, is fitted with an auxilary heating system. The heating system shown comprises a fuel tank 54 and a valve means 56 for turning the fuel on and off. The fuel is fed to burners in the table section 22, not shown, desirably positioned under non-combustible briquets of the various kinds known in the art, for example, those made from ceramic, pumice or the like, which serve to spread the heat uniformly over the area of table section 22. When heat is to be supplied, a grill 58 will normally be positioned over the briquets, among other reasons, to provide a sturdy support for food containers to be heated thereon.

Fuel may consist of substances such as for instance kerosene, propane, and similar materials; charcoal may also be employed, as may be electrical resistance heaters.

The food holding device of the invention may be made from many different materials, depending on whether the device is to be used for heating or cooling, or both, the allowable weight, and similar considerations.

When the device is to be used to maintain contained food in a chilled condition, which is normally its primary function, it has been found desirable to construct the table section 22, and advantageously the cover section 24, from a plastic material such as polystryene, polyvinylchloride, ABS, or other equivalent material having low thermal conductivity. In addition, the surfaces of table section 22, and if desired of cover section 24, can be formed in the desired shape as a lamination comprising outer layers of a relatively rigid plastic skin surrounding a core layer of an insulating material, for example a cellular core substance such as foamed polyurethane, foamed polystyrene and similar structures. Such materials of construction provided light, durable and well insulated walls, well suited to maintaining food in a chilled condition, while facilitating easy movement of the device.

When the food holding device is to be used for maintaining food in a heated condition, metals will be selected as the construction material of choice.

The leg, leg braces, cover support members and shelf are preferably fabricated from sturdy lightweight metals such as magnesium, aluminum, light guage steel or others, and while it is much preferable that such components be permanently attached to the upper and lower halves of the food holding device described, at least some of the components may be fabricated so as to be detachable therefrom.

Additional optional features useful in the practice of the invention include means for suspending insect impenetrable netting from cover section 24 of a length sufficient to extend to the table section 22 when the cover section 24 is in its raised position. Slits may be provided in the netting at convenient intervals about the periphery of the food holding device to allow access to the contents of table section 22.

An additional feature of convenience, particularly for raising the cover section 24 and in transporting the device, is the provision of handles, as for example, those of 62, shown in FIGS. 1 and 2.

While the drawing illustrates a rectangular food holding device, it is within the scope of the invention disclosed to design the device in a different configuration, for example, as a round elliptical, square or other shape.

What is claimed is:

1. A portable food storage device comprising an insulated upper half and a lower half, said upper, or cover half being connected to said lower, or food holding half by support arms such that the two halves can be moved apart from each other, thus permitting access to the contents of said lower half and simultaneously providing a canopy over said lower half, or such halves can be moved adjacent to each other, protectively covering and insulating said lower half and its contents, wherein each of said support arms comprise upper and lower arms joined at pivot points optionally made inoperable by sleeve members disposed thereover when said arms are to be disposed in an upper cover section supporting position, and slidably retracted therefrom when said upper cover section is to be collapsed, and wherein said lower half has attached thereto collapsible legs which may be deployed to support said lower half in table fashion above the surface over which said device is located.

2. A portable food holding device according to claim 1 in which at least one opposite pair of said collapsible legs has wheels attached thereto.

3. A portable food holding device according to claim 2 in which said lower half has a shelf attached thereto which is stowable in a vertical position by rotation about pivot points attached to said lower half.

4. A portable food holding device according to claim 2 having a removable drain plug in the bottom thereof of facilitate draining and cleaning of the device.

5. A portable food holding device according to claim 1 in which said upper and lower halves are fabricated from plastic incorporating a cellular insulating material.

* * * * *